United States Patent
Oh et al.

(10) Patent No.: US 11,526,883 B2
(45) Date of Patent: Dec. 13, 2022

(54) METHOD AND SYSTEM FOR PROVIDING AUTOMATED PAYMENT

(71) Applicant: NHN PAYCO CORPORATION, Seongnam-si (KR)

(72) Inventors: Bomyoung Oh, Seongnam-si (KR); Sang Mi Kim, Seongnam-si (KR)

(73) Assignee: NHN PAYCO CORPORATION, Seongnam-si (KR)

( * ) Notice: Subject to any disclaimer, the term of this patent is extended or adjusted under 35 U.S.C. 154(b) by 435 days.

(21) Appl. No.: 15/633,489

(22) Filed: Jun. 26, 2017

(65) Prior Publication Data

US 2017/0372309 A1  Dec. 28, 2017

(30) Foreign Application Priority Data

Jun. 24, 2016  (KR) .................. 10-2016-0079226

(51) Int. Cl.
| | | |
|---|---|---|
| *G06Q 20/40* | (2012.01) | |
| *G06Q 20/12* | (2012.01) | |
| *G06Q 20/20* | (2012.01) | |
| *G06Q 20/10* | (2012.01) | |
| *G06Q 30/04* | (2012.01) | |

(52) U.S. Cl.
CPC .............. *G06Q 20/40* (2013.01); *G06Q 20/12* (2013.01); *G06Q 20/204* (2013.01); *G06Q 20/401* (2013.01); *G06Q 20/405* (2013.01); *G06Q 20/4012* (2013.01); *G06Q 20/102* (2013.01); *G06Q 30/04* (2013.01)

(58) Field of Classification Search
CPC ........ G06Q 20/40; G06Q 20/20; G06Q 20/10; G06Q 30/04
See application file for complete search history.

(56) References Cited

U.S. PATENT DOCUMENTS

| | | | | | |
|---|---|---|---|---|---|
| 4,910,775 A | * | 3/1990 | Yves | ................. | A63F 13/12 |
| | | | | | 713/184 |
| 5,613,012 A | * | 3/1997 | Hoffman | ................. | G06F 21/32 |
| | | | | | 235/380 |
| 5,805,719 A | * | 9/1998 | Pare, Jr. | ................. | G06F 21/32 |
| | | | | | 382/115 |

(Continued)

FOREIGN PATENT DOCUMENTS

| | | |
|---|---|---|
| JP | 2008-511067 | 4/2008 |
| KR | 10-2005-0003885 | 1/2005 |

(Continued)

OTHER PUBLICATIONS

Office Action dated May 10, 2021 from the Japanese Patent Office for Japanese Patent Application No. 2017-116682.

*Primary Examiner* — Ayal I. Sharon
(74) *Attorney, Agent, or Firm* — H.C. Park & Associates, PLC

(57) ABSTRACT

An automated payment method performed by an automated payment system include: receiving a payment request for a home shopping order from a user of a home shopping server associated with a home shopping broadcast; performing, in an authentication processor, authentication processing on the user based on a user information included in the payment request; and performing, in a payment processor, payment processing corresponding to the payment request based on the user information in response to successful authentication of the user.

11 Claims, 8 Drawing Sheets

(56) References Cited

U.S. PATENT DOCUMENTS

| | | | | |
|---|---|---|---|---|
| 5,870,723 A * | 2/1999 | Pare, Jr. | G06F 21/32 | 705/39 |
| 5,878,141 A * | 3/1999 | Daly | G06Q 20/04 | 235/379 |
| 6,607,136 B1 * | 8/2003 | Atsmon | G06F 21/34 | 235/487 |
| 7,565,680 B1 * | 7/2009 | Asmussen | H04N 21/4223 | 725/135 |
| 7,631,193 B1 * | 12/2009 | Hoffman | G06F 21/32 | 382/115 |
| 8,855,423 B2 * | 10/2014 | Boncyk | G06K 9/00664 | 382/181 |
| 9,953,322 B2 * | 4/2018 | Lee | G06Q 20/322 | |
| 9,990,622 B2 | 6/2018 | Choi et al. | | |
| 10,055,775 B2 * | 8/2018 | Yang | G06Q 20/3278 | |
| 2001/0055951 A1 * | 12/2001 | Slotznick | H04M 1/2757 | 455/41.3 |
| 2002/0073416 A1 * | 6/2002 | Ramsey Catan | H04N 21/4223 | 348/E7.071 |
| 2003/0042301 A1 * | 3/2003 | Rajasekaran | G06Q 20/02 | 235/380 |
| 2003/0105725 A1 * | 6/2003 | Hoffman | G06F 21/32 | 705/75 |
| 2003/0105824 A1 * | 6/2003 | Brechner | G06Q 30/02 | 709/206 |
| 2003/0144903 A1 * | 7/2003 | Brechner | G06Q 30/0271 | 705/14.47 |
| 2005/0183133 A1 * | 8/2005 | Kelly | H04N 21/235 | 725/120 |
| 2008/0065502 A1 * | 3/2008 | Diaz Perez | G06Q 30/06 | 705/27.1 |
| 2008/0076402 A1 * | 3/2008 | Jeong | G06Q 30/02 | 455/422.1 |
| 2008/0187297 A1 * | 8/2008 | Kooijmans | H04N 21/6543 | 386/248 |
| 2008/0189186 A1 * | 8/2008 | Choi | G06Q 20/32 | 705/26.35 |
| 2008/0195664 A1 * | 8/2008 | Maharajh | H04L 67/306 | |
| 2008/0235108 A1 * | 9/2008 | Kulakowski | G06Q 30/00 | 705/26.8 |
| 2010/0049654 A1 * | 2/2010 | Pilo | G06Q 20/02 | 705/43 |
| 2011/0023073 A1 * | 1/2011 | McCarthy | G06Q 30/0603 | 725/98 |
| 2011/0119156 A1 * | 5/2011 | Hwang | G06Q 30/0613 | 235/380 |
| 2011/0225417 A1 * | 9/2011 | Maharajh | H04L 65/4076 | 713/150 |
| 2011/0302614 A1 * | 12/2011 | Padmanabhan | H04N 21/42206 | 725/61 |
| 2013/0110672 A1 * | 5/2013 | Yang | G06Q 20/353 | 705/26.8 |
| 2013/0166452 A1 * | 6/2013 | Song | H04N 21/2543 | 705/44 |
| 2013/0166580 A1 * | 6/2013 | Maharajh | H04W 4/18 | 707/758 |
| 2013/0347013 A1 * | 12/2013 | Sivaraman | G06Q 30/0601 | 725/5 |
| 2014/0052638 A1 | 2/2014 | Chung et al. | | |
| 2014/0058897 A1 * | 2/2014 | Yang | G06Q 20/306 | 705/26.61 |
| 2014/0222676 A1 * | 8/2014 | Lee | G06Q 20/14 | 705/44 |
| 2015/0326935 A1 * | 11/2015 | Owen | H04N 21/2542 | 725/60 |
| 2016/0012433 A1 * | 1/2016 | Marenick | G06Q 20/409 | 705/72 |
| 2016/0180305 A1 | 6/2016 | Dresser et al. | | |
| 2017/0193475 A1 * | 7/2017 | Mercilie | G06Q 20/3224 | |
| 2017/0193490 A1 * | 7/2017 | Mercilie | G06Q 20/325 | |
| 2019/0207935 A1 * | 7/2019 | Poovappa | H04M 3/53333 | |

FOREIGN PATENT DOCUMENTS

| | | |
|---|---|---|
| KR | 20090090427 A * | 8/2009 |
| KR | 101006876 B1 * | 1/2011 |
| KR | 10-2012-0100641 | 9/2012 |
| KR | 10-2013-0012315 | 2/2013 |
| KR | 10-1626884 | 6/2016 |

* cited by examiner

METHOD AND SYSTEM FOR PROVIDING AUTOMATED PAYMENT

CROSS-REFERENCE TO RELATED APPLICATION

This application claims priority from and the benefit of Korean Patent Application No. 10-2016-0079226, filed on Jun. 24, 2016, which is hereby incorporated by reference for all purposes as if fully set forth herein.

BACKGROUND

Field

The invention relates generally to home shopping broadcasts, and more particularly, to an automated system and method to facilitate automated payments of merchandise purchased from a home shopping broadcast.

Discussion of the Background

In general, to order merchandise from a home shopping broadcast, a payment is method uses an automatic ordering telephone call by an automatic response service (ARS). In many cases, a user makes the automatic ordering call by ARS while watching a live TV.

As an example of payment technology using an ARS, Korean Patent Publication No. 10-20058-0003885, published on Jan. 12, 2005, discloses technology for processing a payment by credit card using an ARS during an electronic commerce (e-commerce) transaction process.

An ordering method using an ARS requires a relatively large amount of time to complete an order, such as the time to listen to voice guidance, waiting time for connection to an operator, time for inputting personal information including payment information, and the like. During this process, products may be sold out or the corresponding home shopping broadcast may be terminated. Also, since payment information needs to be input every time, it is troublesome and inconvenient for a buyer. Further, the buyer's personal information including payment information may be exposed to a home shopping company, which may cause a personal information leakage issue.

The above information disclosed in this Background section is only for enhancement of understanding of the background of the inventive concepts, and, therefore, it may contain information that does not form the prior art that is already known in this country to a person of ordinary skill in the art.

SUMMARY

Automated payment methods and systems constructed according to the principles of the invention provide technological improvements in computer networks used to purchase merchandise from a home shopping broadcasts that may reduce the amount of time used for a is payment process upon ordering from a home shopping broadcast, minimize the troublesomeness and inconvenience of a user, and/or provide for enhanced security.

Additional features of the invention will be set forth in the description which follows, and in part will be apparent from the description, or may be learned by practice of the invention.

According to one aspect of the invention, an automated payment method performed by an automated payment system includes the steps of: receiving a payment request for a home shopping order from a user of a home shopping server associated with a home shopping broadcast; performing, in an authentication processor, authentication processing on the user based on a user information included in the payment request; and performing, in a payment processor, payment processing corresponding to the payment request based on the user information in response to successful authentication of the user.

The home shopping server may be configured to include, in the payment request, a phone number of the user, and further including the step of transmitting the payment request to the automated payment system.

The home shopping server may be configured to include, in the payment request, a phone number of a caller that is connected upon ordering through a call connection with the home shopping broadcast, and further includes the step of transmitting the payment request to the automated payment system.

The home shopping server may be configured to include, in the payment request, a phone number that is received from a terminal used for viewing the home shopping broadcast upon ordering through the terminal, and further includes the step of transmitting the payment request to the automated payment system.

The payment processing step may include transmitting a payment uniform resource locator (URL) including information about a payment screen corresponding to the payment request to a terminal corresponding to the phone number; and performing the payment processing corresponding to the payment request based on payment information input through the payment screen.

The payment processing step may further include recognizing the home shopping broadcast from information corresponding to the payment URL and recommending at least one of a payment method and benefit information based on the home shopping broadcast.

The automated payment method may further include the step of pre-registering payment information to be used for the home shopping order, and matching the payment information to the user information.

The matching step may include separately registering payment information to be commonly used for a plurality of home shopping broadcasts and separately registering payment information for each home shopping broadcast.

The payment processing step may include verifying whether the user agrees to use an automatic payment for the home shopping broadcast; and performing the payment processing corresponding to the payment request using payment information matched to the user information, in response to the user agreeing to use the automatic payment for the home shopping broadcast.

The payment processing step may include verifying whether the user agrees to use an automatic payment for the home shopping broadcast; verifying payment information matched to the user information, in response to the user agreeing to use the automatic payment for the home shopping broadcast; transmitting information about a plurality of payment methods to the home shopping server when the payment information includes the plurality of payment methods; and performing the payment processing corresponding to the payment request using one of the plurality of payment methods selected by the user. The home shopping server may be configured to provide information about the plurality of payment methods through a home shopping order path of the user.

According to another aspect of the invention, a non-transitory computer-readable storage medium stores instructions that, when executed by a processor, cause the processor to perform an automated payment method includes the steps of receiving a payment request including user information for a home shopping order from a user of a home shopping server associated with a home shopping broadcast; performing an authentication processing on the user based on user information; and performing a payment processing corresponding to the payment request based on the user information in response to a successful authentication of the user. According to yet another aspect of the invention, an automated payment system configured as a computer includes an authentication processor configured to, in response to receiving a payment request for a home shopping order from a user of a home shopping server associated with a home shopping broadcast, perform authentication processing on the user based on a user information included in the payment request; and a payment processor configured to perform payment processing corresponding to the payment request based on the user information in response to a successful authentication of the user.

The home shopping server may be configured to include, in the payment request, a phone number of a caller that is connected upon ordering through a phone connection with the home shopping broadcast, and to transmit the payment request to the automated payment system.

The home shopping server may be configured to include, in the payment request, is a phone number that is received from a terminal used for viewing the home shopping broadcast upon ordering through the terminal, and to transmit the payment request to the automated payment system.

The home shopping server may be configured to include, in the payment request, a phone number of the user who requests an order from the home shopping broadcast, and to transmit the payment request to the automated payment system, and the payment processor may be configured to transmit a payment uniform resource locator (URL) including link information about a payment screen corresponding to the payment request to a terminal corresponding to the phone number, and to perform the payment processing corresponding to the payment request based on payment information input through the payment screen.

The payment processor may be further configured to recognize a predetermined home shopping broadcast from information corresponding to the payment URL and to recommend at least one of a payment method and benefit information based on the recognized home shopping broadcast.

The automated payment system may further include an information manager configured to pre-register payment information to be used for the home shopping order, and to match the payment information to the user information.

The information manager may be further configured to separately register payment information to be commonly used for a plurality of home shopping broadcasts, and separately register payment information for each of the plurality of home shopping broadcasts.

The payment processor may be further configured to verify whether the user agrees to use an automatic payment for the home shopping broadcast, and perform payment processing corresponding to the payment request using payment information matched to the user information, in response to the user agreeing to use the automatic payment for the home shopping broadcast.

The payment processor may be further configured to verify whether the user agrees to use an automatic payment for the home shopping broadcast; verify payment information matched to the user information, in response to the user agreeing to use the automatic payment for the home shopping broadcast; transmit information about a plurality of payment methods to the home shopping server in response to the payment information including the plurality of payment methods; and perform payment processing corresponding to the payment request using a payment method selected by the user from among the plurality of payment methods, and the home shopping server may be configured to provide information about the plurality of payment methods through a home shopping order path of the user.

Exemplary implementations constructed according to the principles of the invention provide a number of technological improvements. For example, using a processor to match the user's payment information to the user's payment request, an automated payment obviates the need to request a user to say or input payment information for every transaction, thereby reducing the user's burden and significantly reducing payment time.

In addition, in exemplary implementations, it is possible to provide a user with an easy and convenient payment environment in which personal information leakage is minimized by pre-registering payment information through the processor and then immediately proceeding with a home shopping payment only with a simple authentication.

In addition, in exemplary implementations, it is possible to process payment information of a user with enhanced security by using a virtual card number instead of maintaining the payment information at a home shopping company or a payment processing institution.

In addition, in exemplary implementations, it is possible to enhance the brand effect of a home shopping company by providing an automated payment method optimized for transactions associated with a home shopping broadcast while ensuring the convenience and security of a payment.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
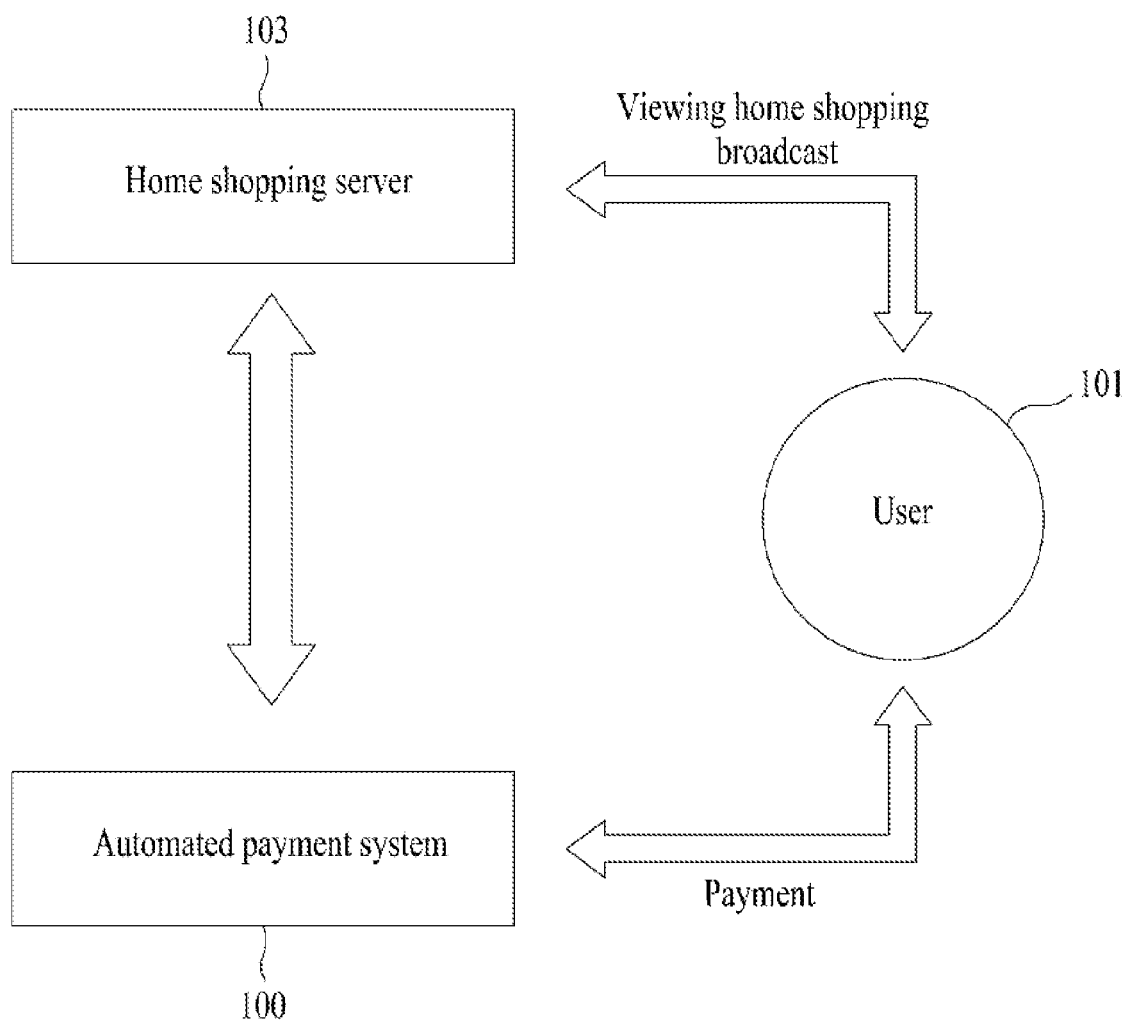
FIG. 1 illustrates an example of a typical payment environment for home shopping in which the systems and methods of the invention may be employed.

Exemplary embodiments will be described in detail with reference to the accompanying drawings. These exemplary embodiments will be described in detail for those skilled in the art in order to practice the present disclosure. It should be appreciated that various exemplary embodiments are different but do not have to be exclusive. For example, specific shapes, configurations, and characteristics described in an example embodiment may be implemented in another example embodiment without departing from the spirit and the scope of the present disclosure. In addition, it should be understood that position and arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing exemplary embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

Hereinafter, exemplary embodiments are described in detail with reference to the accompanying drawings.

The exemplary embodiments related to technology for home shopping payment and, more particularly, to a method and system for providing an automated payment process optimized for transactions associated with a home shopping broadcast while ensuring convenience and security of a payment.

FIG. 1 illustrates an example of a typical payment environment for home shopping in which the systems and methods of the invention may be employed. FIG. 1 illustrates a user 101, a home shopping server 103, and an automated payment system 100. Here, the user 101 may indicate a terminal substantially used by an actual user. In FIG. 1, indicators with arrowheads may indicate that data may be transmitted and received between the components of FIG. 1 over a wired and wireless network.

A terminal used by the user 101 (or user terminal 101) may execute at least one process configured to perform at least one of the features described herein. The terminal used by is the user 101 may refer to any type of terminal devices capable of installing and executing a dedicated application associated with the automated payment system 100. Here, the terminal used by the user 101 may perform the overall service operation, such as a service screen configuration, a data input, a data transmission and reception, a data storage, and the like, under control of the dedicated application.

The user 101, as a viewer of a home shopping broadcast, corresponds to a buyer that orders a product while viewing the home shopping broadcast. The user 101 may proceed with a payment through a dedicated application for product ordering while viewing the home shopping broadcast. Here, a terminal used for the payment may be the same as or different from the terminal used for viewing the home shopping broadcast.

A representative example of the terminal used for the user 101 to view the home shopping broadcast may be a television (TV). The TV may indicate broadcasting media, such as a general public TV receiver, an Internet TV, digital multimedia broadcasting (DMB), and the like, that serves as a medium for broadcasting a home shopping program (broadcast) in real time. A terminal used for a home shopping payment may indicate any type of terminal devices, such as an Internet TV, a smartphone, a tablet, a wearable computer, a personal computer (PC), a laptop computer, and the like, capable of installing and executing a dedicated application.

For example, an Internet TV or a smartphone allows the user 101 to view a home shopping broadcast and to proceed with a payment, whereas a general public TV receiver does not allow installation and execution of the dedicated application. Thus, when the user 101 desires to order a product while viewing a home shopping broadcast of the product through a TV, the user 101 uses a separate terminal in which the dedicated application is installed.

The terminal used by the user 101 may be directly or indirectly coupled with a network, for example, the Internet, a local area network (LAN), and the like. For example, a PC and a laptop computer may be directly coupled with a network through a wired network connection. A laptop computer may be wirelessly coupled with a network through a wireless communication channel established between the laptop computer and a wireless access point (WAP). A smartphone may be wirelessly coupled with a network through a wireless communication channel established between the smartphone and a cellular network/bridge. Here, the network may communicate with at least one secondary network. Examples of the secondary network may include a LAN, a wide area network, an intranet, and the like.

The terminal used by the user 101 may interact with a home shopping server 103 and/or the automated payment system 100 over the aforementioned network.

The home shopping server 103 serves as a platform that provides a home shopping program (broadcast) to the user 101 corresponding to a client, and may include a content provider (CP) and a home shopping ordering system that provide a broadcast program. In particular, the home shopping server 103 may provide an ARS for product ordering, and may implement an automated payment process in conjunction with the automated payment system 100.

The automated payment system 100 may execute at least one process configured to perform at least one of the features described herein. The automated payment system 100 serves as a payment processing center having equipment that processes a payment in response to a request of the home shopping server 103. In particular, the automated payment system 100 may provide an automated payment environment in which an unnecessary process is excluded and a security is enhanced during the ordering by a home shopping process.

The automated payment system 100 corresponds to a server computer and may include, for example, a server computing device, a personal computer, a series of server computers, a mini computer, and/or a main frame computer. The server computer may be a distributive system, and operations of the server computer may be simultaneously and/or sequentially executed on at least one processor.

At least a portion of the components of the automated payment system 100 may be configured as a form of an application installed on the terminal used by the user 101 and, without being limited thereto, may be configured to be included in a platform that provides an automated payment service in a client-server environment.

Figure 2:
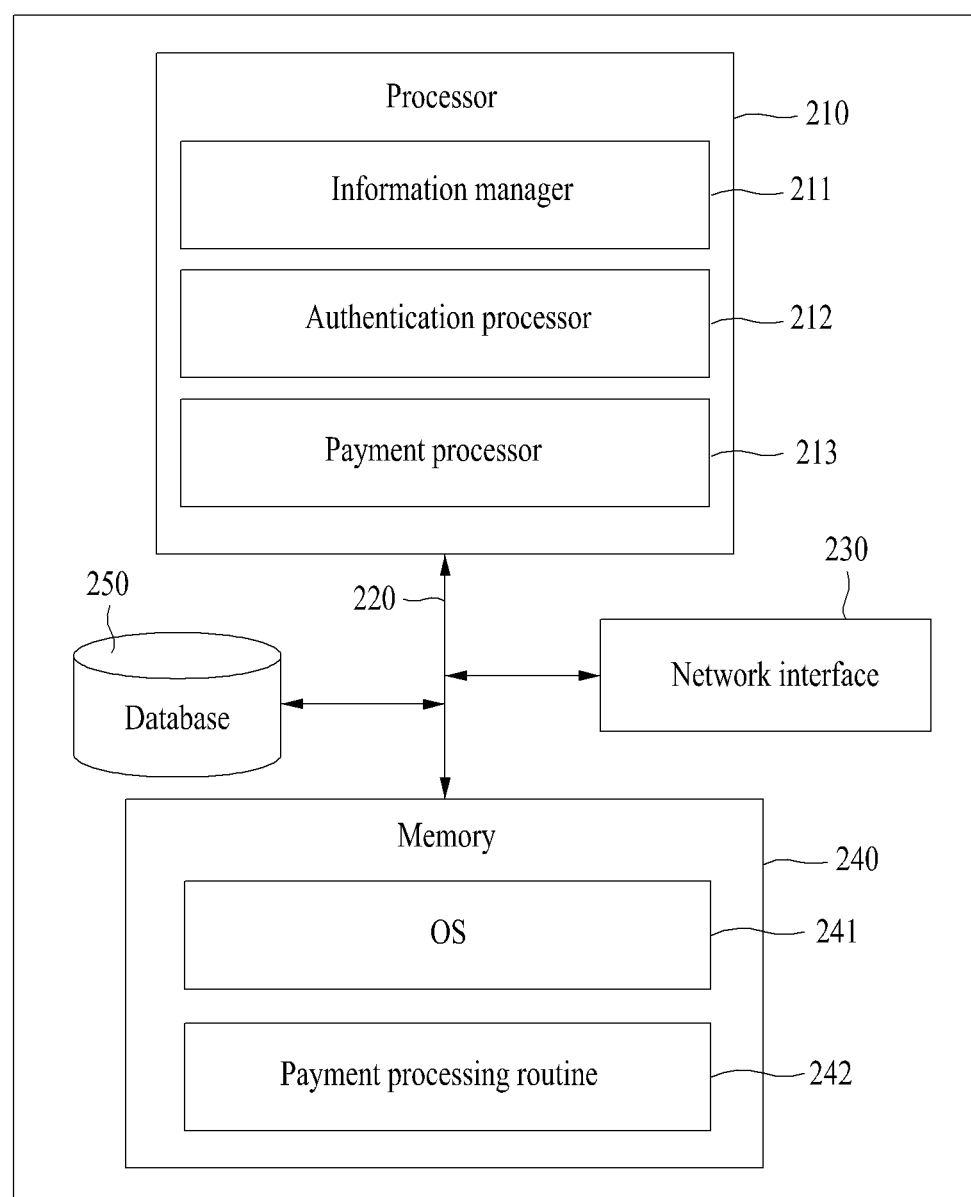
FIG. 2 illustrates an example of an automated payment hardware system constructed according to the principles of the invention.
Figure 3:
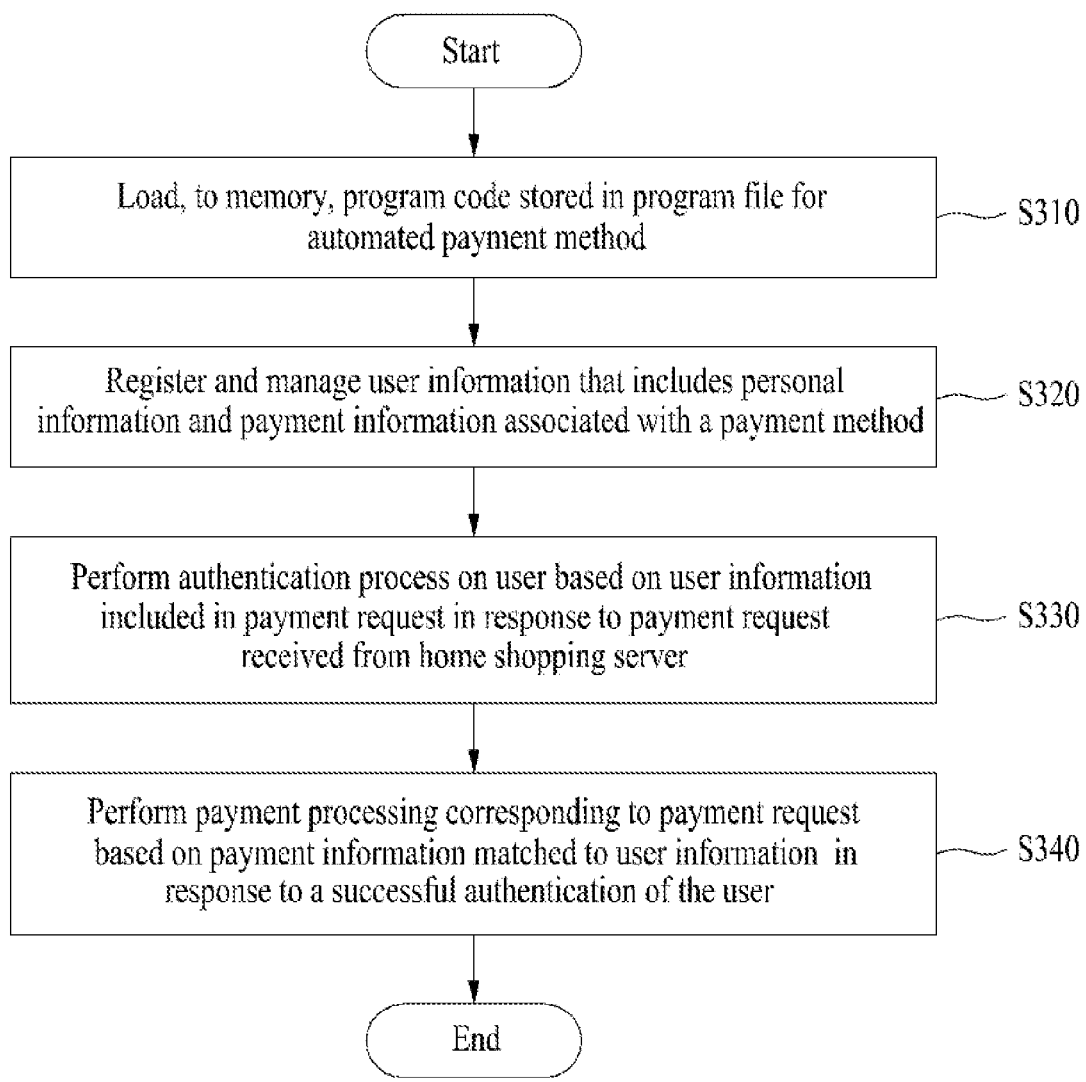
FIG. 3 is a flowchart illustrating an exemplary automated payment method according to the principles of the invention.

FIG. 2 illustrates an example of an automated payment hardware system constructed according to the principles of the invention, and FIG. 3 is a flowchart illustrating an exemplary automated payment method according to the principles of the invention.

Referring to FIG. 2, the automated payment system 100 may include a processor 210, a bus 220, a network interface 230, a memory 240, and a database 250. The memory 240 may include an operating system (OS) and a payment processing routine 242. According to other exemplary embodiments, the automated payment system 100 may include a greater or lesser number of components than the number of components shown in FIG. 2.

The memory 240 may include a permanent mass storage device, such as random access memory (RAM), read only memory (ROM), and a disk drive, as a non-transitory computer-readable recording medium. Also, program codes for the OS 241 and the payment processing routine 242 may be stored on the memory 240. Software components may be loaded from another non-transitory computer-readable medium other than the memory 240. The other non-transitory computer-readable recording medium may include, for example, a floppy drive, a disk, a tape, a DVD/CD-ROM drive, a memory card, and the like. According to other exemplary embodiments, software components may be loaded to the memory 240 through the network interface 230 instead of the computer-readable recording medium.1

The bus 220 enables communication and data transmission between the components of the automated payment system 100. The bus 220 may be configured using a high-speed serial bus, a parallel bus, a storage area network (SAN) and/or other appropriate communication technologies.

The network interface 230 may be a computer hardware component for connecting the automated payment system 100 to a computer network. The network interface 230 may connect the automated payment system 100 to the computer network through a wireless connection or a wired connection.

The database 250 serves to store and maintain information required for an automated payment. Here, the database 250 may store identification information, for example, a mobile phone number, an ID, etc., of each user or an identification key that is matched to the identification information. The database 250 may store information about a payment method used for ordering a product of a home shopping broadcast in association with identification information or an identification key of each user. Information about the payment method may be received from the user through a separate advance registration, or may be extracted from a previous payment record of the user. Although FIG. 2 illustrates that the database 250 is included in the automated payment system 100, the database 250 may be present as an external database constructed on a separate system. For example, an information database constructed on an external platform capable of interacting with the automated payment system 100 may be used as the database 250.

The processor 210 may be configured to process computer-readable instructions of a computer program by performing basic arithmetic operations, logic operations, and input/output (I/O) operations of the automated payment system 100. The computer-readable instructions may be provided from the memory 240 or the network interface 230 to the processor 210 through the bus 220.

Referring to FIG. 2, the processor 210 may include an information manager 211, an authentication processor 212, and a payment processor 213. The components of the processor 210 may be representations of different functions performed at the processor 210 in response to a control command provided by at least one program code. For example, the information manager 211 may be used as a functional representation so that the processor 210 may control the automated payment system 100 to manage personal information including payment information. The processor 210 and the components of the processor 210 may perform operations 5310 through 5340 included in the automated payment method of FIG. 3. For example, the processor 210 and the components of the processor 210 may be configured to execute instructions corresponding to at least one program code and a code of the OS 241 included in the memory 240. Here, the at least one program code may correspond to a code of a program configured to process the automated payment method.

The automated payment method may not be performed in order illustrated in FIG. 3. A portion of the operations may be omitted from or an additional process may be added to the automated payment method.

Referring to FIG. 3, in operation 5310, the processor 210 may load, to the memory 240, a program code stored in a program file for the automated payment method. For example, the program file for the automated payment method may be stored in a permanent storage device. The processor 210 may control the automated payment system 100 so that the program code may be loaded from the program file stored in the permanent storage device to the memory 240 through the bus 220.

Here, the processor 210 and the information manager 211, the authentication processor 212, and the payment processor 213 included in the processor 210 may be different functional representations of the processor 210 to perform operations 5320 through 5340 by executing an instruction of a portion corresponding to the program code loaded to the memory 240. The processor 210 and the components of the processor 210 may directly process an operation according to a direct control instruction or may control the automated payment system 100 to perform operations 5320 through 340.

In operation S320, the information manager 211 may register and manage user information that includes personal information and payment information associated with a payment method for each user. For example, the information manager 211 may register and manage user information for each user such as identification information, for example, a mobile phone number, an ID, and the like, of a corresponding user or an identification key that is matched to the identification information. The information manager 211 may match payment information to user information of each user, and may register and manage the payment information matched to the user information. Here, the payment information may be directly input by a user through a separate advance registration procedure and thereby registered. Here, the user may register a payment method commonly available for any home shopping broadcast, or may register a separate payment method for each home shopping broadcast. As another example, the payment information may be automatically extracted from a previous payment record of the user and registered. For example, based on a user agreement with a payment method used for a previous payment, the payment method may be registered to be used for a subsequent payment.

In operation S330, in response to a payment request received from the home shopping server 103, the authentication processor 212 may perform an authentication process on the user based on user information included in the payment request. For example, the user may order a product using an ARS with a phone number presented on a home shopping broadcast while viewing the home shopping broadcast, or may order a product by using a menu presented on the home shopping broadcast through a TV. Here, the home shopping server 103 may receive a product ordering request through the ARS or the TV, and may transmit, to the automated payment system 100, the payment request that includes corresponding user information of the user ordering the product. For example, the home shopping server 103 may acquire a mobile phone number of the user by requesting the user to input the mobile phone number through the TV, or by tracking a calling number connected to the ARS. The authentication processor 212 may receive, from the home shopping server 103, the mobile phone number of the user requesting a payment, and may perform a user authentication using the received mobile phone number. A mobile phone authorization method for verifying whether a corresponding mobile phone is owned by a legitimate user may be employed for the user authentication. It is provided as an example only and any authentication method for determining whether the user is a legitimate user may be applied.

In operation S340, in response to a successful authentication of the user, the payment processor 213 may perform a payment processing step corresponding to the payment request of the home shopping server 103 based on the payment information that is matched to the user information. The payment request of the home shopping server 103 may include a payment amount and the like. In response to a successful authentication of the user, the payment processor 213 may process a payment for the payment amount included in the payment request based on the payment information of the corresponding user. For example, the payment processor 213 may verify whether the payment information is pre-registered and, if the payment information of the user is pre-registered and the user authentication succeeds, the payment processor 213 may immediately perform an automatic payment processing step based on the payment information of the user. As another example, if the payment information of the user is not pre-registered, the payment processor 213 may transmit a payment URL that is a link information about an invoice using a mobile phone number of the user, and may receive the payment information from the user through the invoice connected to the payment URL and may perform the payment processing.

Accordingly, the automated payment system 100 may configure a simplified, but automated home shopping payment process using the mobile phone number transferred from the home shopping server 103 in response to the payment request for the home shopping order of the user from the home shopping server 103.

Figure 4:
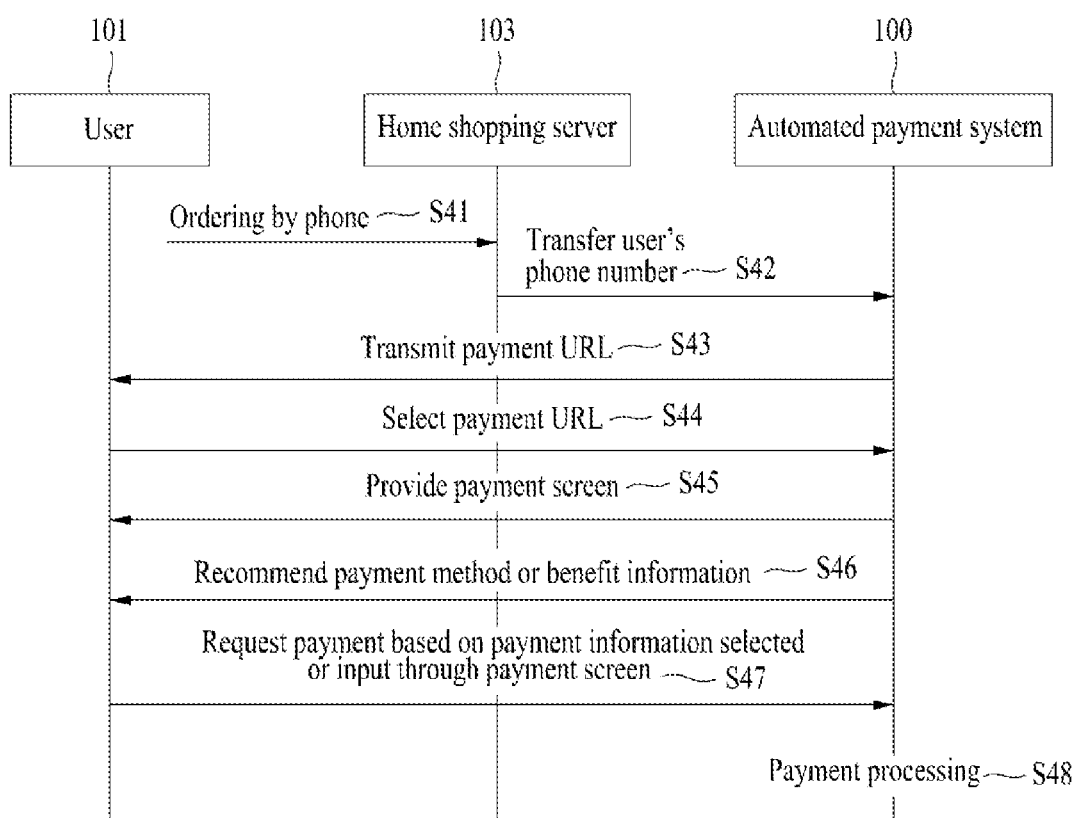
FIG. 4 illustrates an exemplary home shopping payment process according to the principles of the invention.

FIG. 4 illustrates an exemplary home shopping payment process according to the principles of the invention. The home shopping payment process of FIG. 4 refers to a payment process for a user who does not have pre-registered payment information, that is, a user disallowing use of an automatic payment.

In operation S41, the user may be connected to a corresponding home shopping broadcast through an ARS or an agent by calling a phone number presented on the home shopping broadcast using a mobile phone of the user while viewing the home shopping broadcast on a TV, and may order a product according to a guidance of the home shopping broadcast.

In operation S42, the home shopping server 103 may verify an order option and a delivery location of the user following guidance, provided in the form of an informational message on a screen, text message on a mobile phone, voice guidance from a person, or the like, and may transfer, to the automated payment system 100, a caller number, in response to a payment request from the user in association with the automated payment system 100 during a payment method selection process. The caller number may be a mobile phone number of the user that is associated with the automated payment system 100. Here, the home shopping server 103 may transfer, to the automated payment system 100, the payment request that includes identification information of the home shopping server 103, the payment amount for the product ordered by the user, and the mobile phone number of the user. In addition to the connected caller number, the home shopping server 103 may transfer, to the automated payment system 100, the mobile phone number that is directly input by the user according to the guidance. Here, the home shopping server 103 may transfer the payment request to the automated payment system 100 in conjunction with the automated payment system 100 and may terminate the call connection with the corresponding user.

In operation S43, in response to the payment request from the home shopping server 103, the automated payment system 100 may generate a payment URL that is link information about a payment screen corresponding to the payment request and may transmit the payment URL to the user terminal 101 of the mobile phone number included in the payment request. For example, the automated payment system 100 may transmit the payment URL to the user terminal 101 through a text service, for example, a short messaging service (SMS), a multimedia messaging service (MMS), and the like, or may push the payment URL to a dedicated application installed on the user terminal 101.

The user terminal 101 may receive the payment URL through the SMS, the MMS, or a push function of the dedicated application. In response to a user click on the payment URL, the dedicated application may be automatically executed and a selection signal of the payment URL may be transferred to the automated payment system 100 in operation S44.

In operation S45, in response to the selection signal of the payment URL received from the user terminal 101, the automated payment system 100 may provide the payment screen corresponding to the payment URL through the dedicated application executed on the user terminal 101.

In operation S46, in response to a user click on the payment URL, the automated payment system 100 may automatically recognize a specific home shopping broadcast from information corresponding to the payment URL and may recommend a payment method most suitable for the recognized home shopping broadcast or may recommend benefit information, for example, an available coupon, for the recognized home shopping broadcast. For example, the automated payment system 100 may recommend no-interest financing or a discount benefit or may recommend the user to use a coupon, a reserve, etc., through the payment screen of the dedicated application installed on the user terminal 101.

In operation S47, the dedicated application installed on the user terminal 101 may request the automated payment system 100 for the payment based on payment information selected or input through the payment screen. The user may select or input a desired payment method, benefit information, and the like, for home shopping ordering through the payment screen provided in response to the click on the payment URL.

In operation S48, in response to the payment request of the dedicated application executed on the user terminal 101, the automated payment system 100 may perform a payment processing corresponding to the payment request of the home shopping server 103 based on payment information selected or input from the user. The automated payment system 100 may notify the home shopping server 103 and/or the dedicated application installed on the user terminal 101 of the payment processing result.

According to an exemplary embodiment, when the user selects an automated payment upon ordering by phone for a home shopping broadcast, the home shopping server 103 may transfer the mobile phone number of the user to the automated payment system 100 instead of receiving payment information of the user through a call using the ARS or the agent. The automated payment system 100 may transmit a URL for the payment to the user terminal 101 of the mobile phone number, may receive payment information through a payment screen provided to the URL, and may proceed with the payment processing.

In addition to ordering by phone, the user may order a product by following a menu presented on the home shopping broadcast while viewing the home shopping broadcast through a TV. The home shopping server 103 may receive an ordering request by following the menu using the TV. The aforementioned home shopping payment process including operations S42 through S48 of FIG. 4 may be applied to the ordering request using the TV.

Figure 5:
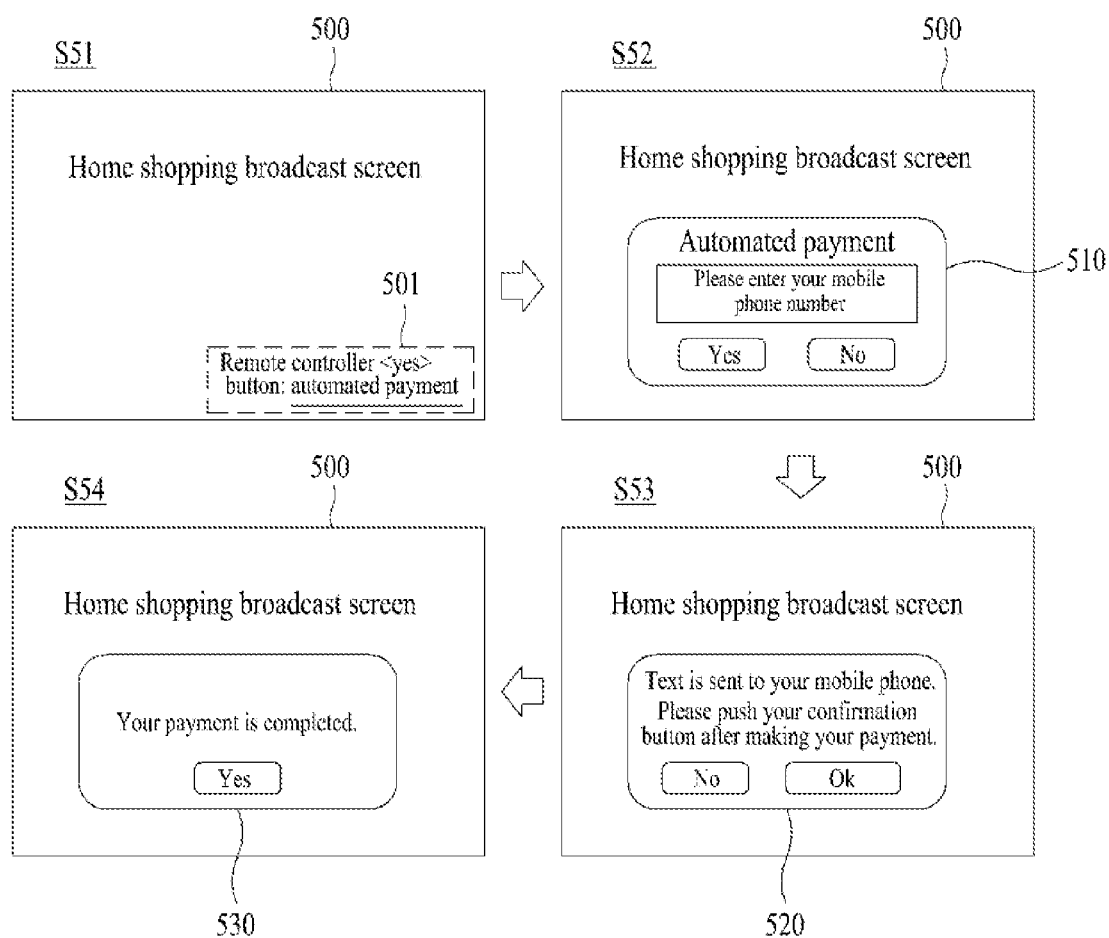
FIG. 5 illustrates another exemplary home shopping payment process according to the principles of the invention.

FIG. 5 illustrates another exemplary home shopping payment process according to the principles of the invention.

More specifically, FIG. 5 illustrates a process of proceeding with a payment for a home shopping order through a TV.

Referring to FIG. 5, when a user views a home shopping broadcast on a TV, the home shopping server 103 may display selection path guide information 501 for an automated payment on a home shopping broadcast screen 500 (S51). When the user views the home shopping broadcast using an Internet TV, the home shopping server 103 may directly communicate with a corresponding terminal used by the user. When the user uses a TV such as a general public TV receiver, the home shopping server 103 may communicate with the corresponding terminal used by the user in conjunction with a content provider ("CP") that broadcasts the corresponding home shopping broadcast. It is provided as an example only and a communication environment between the home shopping server 103 and the TV may be readily changeable and expandable.

In response to a user's command on the TV using a remote controller, for example, to request the automated payment, the home shopping server 103 may display an input screen 510 for receiving a mobile phone number of the user on the home shopping broadcast screen 500 (S52) and may transfer, to the automated payment system 100, the mobile phone number that is input by the user through the input screen 510. The payment process performed by the automated payment system 100 may be performed through the same home shopping payment process (S43 through S48) of FIG. 4.

The home shopping server 103 may display step by step guidance information about the payment process on the home shopping broadcast screen 500 in conjunction with the automated payment system 100. For example, in response to a payment URL transmitted from the automated payment system 100 to a mobile phone number of the user, the home shopping server 103 may provide payment guidance information 520 that includes a guidance text indicating, for example, a URL transmission, a guidance text requesting a user confirmation for the payment, a menu for the payment, and the like (S53). Once the payment for the ordering request using the TV is completed at the automated payment system 100, the home shopping server 103 may provide payment completion guidance information 530 that includes a guidance text indicating a payment completion (S54).

Accordingly, the automated payment system 100 may transmit the payment URL to the mobile phone number of the user transmitted from the home shopping server 103 for the order using the phone or the TV, and may perform the payment processing based on payment information that is input from the user to the corresponding terminal through the dedicated application or a mobile web connected to the payment URL.

As another example, instead of receiving payment information for each home shopping order, payment information to be used for a corresponding home shopping order may be pre-registered to the automated payment system 100 and an automatic payment using the pre-registered payment information may be allowed.

Figure 6:
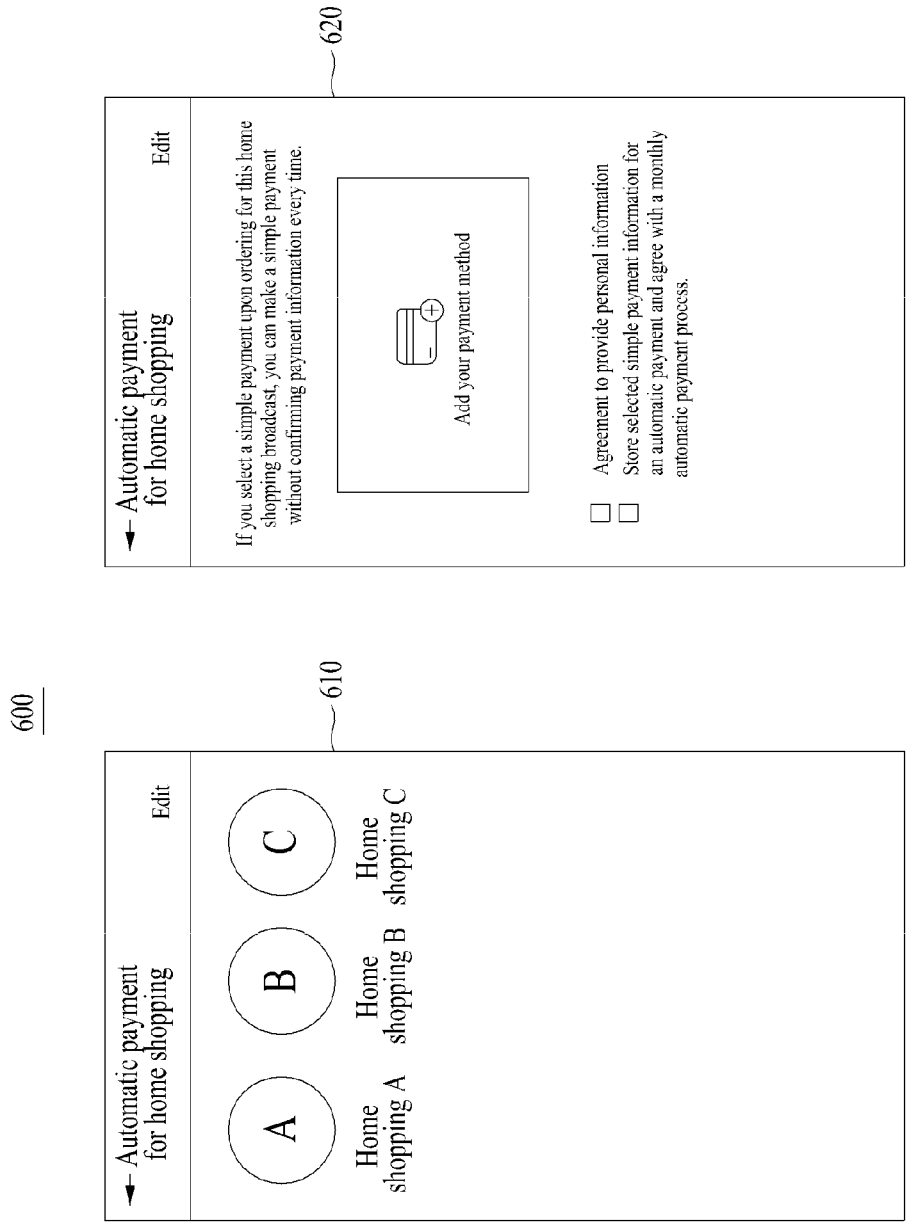
FIG. 6 illustrates an exemplary setting screen for setting an automatic payment for a home shopping broadcast according to the principles of the invention.

FIG. 6 illustrates an exemplary setting screen for setting an automatic payment for a home shopping broadcast according to the principles of the invention.

Referring to FIG. 6, a setting screen 600 for setting an automatic payment for transactions associated with a home shopping broadcast may be provided to a dedicated application associated with the automated payment system 100.

The setting screen 600 may include a home shopping broadcast list screen 610 for displaying a list of home shopping broadcasts, for example, a list of franchises, TV channels and the like, capable of providing an automated payment service, a payment method registration screen 620 for registering and adding a payment method for an automatic payment for a home shopping broadcast, and the like.

Through the setting screen 600, the user may set a payment method to be commonly used for all the home shopping broadcasts included in the list, or may set an individual payment method to be used for each home shopping broadcast included in the list.

The automated payment system 100 may store virtual information instead of storing actual information, for example, an actual card number, account number, and the like, for a payment method.

When the user has pre-registered a payment method to be used for ordering from a home shopping broadcast and agreed to an automatic payment for the home shopping broadcast, the automated payment system 100 may identify the preregistered payment method of the user based on a mobile phone number of the user transferred from the home shopping server 103. The automated payment system 100 may also immediately perform an authorization processing step on a payment for the order associated with the home shopping broadcast without performing a separate payment information verification process.

Figure 7:
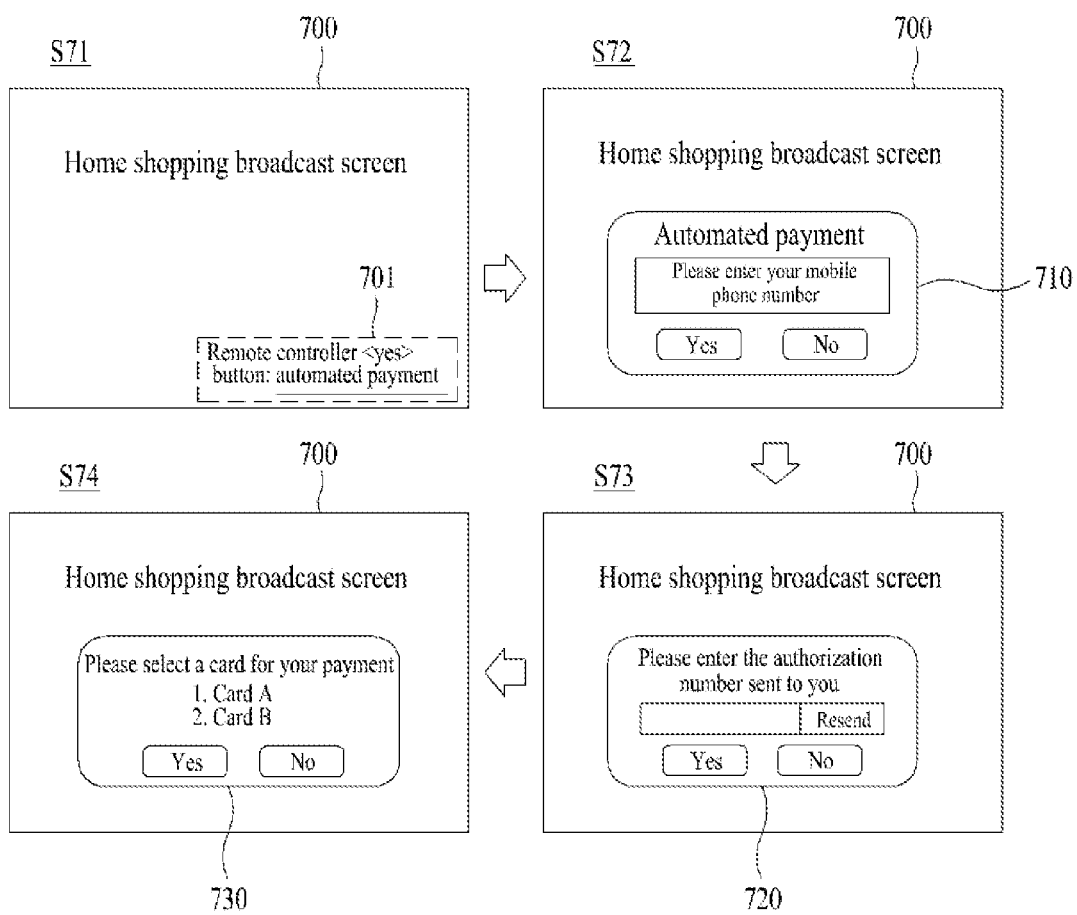
FIG. 7 illustrates an exemplary automatic payment process for a home shopping broadcast according to the principles of the invention.

FIG. 7 illustrates an exemplary automatic payment process for a home shopping broadcast according to the principles of the invention.

More specifically, a process of proceeding with an automatic payment for ordering with a home shopping broadcast using a TV is described with reference to FIG. 7.

Referring to FIG. 7, when a user views a home shopping broadcast on a TV, the home shopping server 103 may display selection path guide information 701 for an automated payment on a home shopping broadcast screen 700 (S71).

In response to a user's command on the TV using a remote controller, etc., to request the automated payment, the home shopping server 103 may display an input screen 710 for receiving a mobile phone number of the user on the home shopping broadcast screen 700 (S72) and may transfer, to the automated payment system 100, the mobile phone number that is input by the user through the input screen 710.

In response to the mobile phone number transferred from the home shopping server 103, the automated payment system 100 may verify whether the user of the mobile phone number has agreed with an automatic payment for the home shopping broadcast and, when the user is verified to have agreed with the automatic payment, may transmit an authorization number to the mobile phone number.

In response to the authorization number transmitted from the automated payment system 100 to the mobile phone number of the user, the home shopping server 103 may display an input screen 720 for receiving the authorization number on the home shopping broadcast screen 700 in conjunction with the automated payment system 100 (S73), and may transfer, to the automated payment system 100, the authorization number that is input by the user through the input screen 720.

When the authorization number transmitted from the automated payment system 100 to the mobile phone of the user is matched to the authorization number received from the home shopping server 103, the automated payment system 100 may immediately authorize the automatic payment for home shopping using the payment method pre-registered by the user.

In addition to the authorization number, a payment password, a personal identification number (PIN), a resident registration number, and the like may be employed for a user authentication method.

When a plurality of payment methods is pre-registered by the user, the automated payment system 100 may transfer information about a payment method list to the home shopping server 103 to request the user to select a payment method through the TV.

The home shopping server 103 may receive information about the payment method list of the user from the automated payment system 100 and may display a selection screen 730 for receiving a selection on a specific payment method from the payment method list on the home shopping broadcast screen 700 that is a home shopping ordering path of the user (S74), and may transfer, to the automated payment system 100, information about the payment method selected by the user through the selection screen 730.

Although the plurality of payment methods is pre-registered by the user, the automated payment system 100 may immediately authorize the automatic payment using the payment method selected by the user.

Accordingly, if the user has pre-registered a payment method for a home shopping order through a TV and has agreed to an automatic payment for a corresponding home shopping broadcast, the user may conveniently and easily complete a payment through an authorization successfully with a mobile phone number owned by the user.

Figure 8:
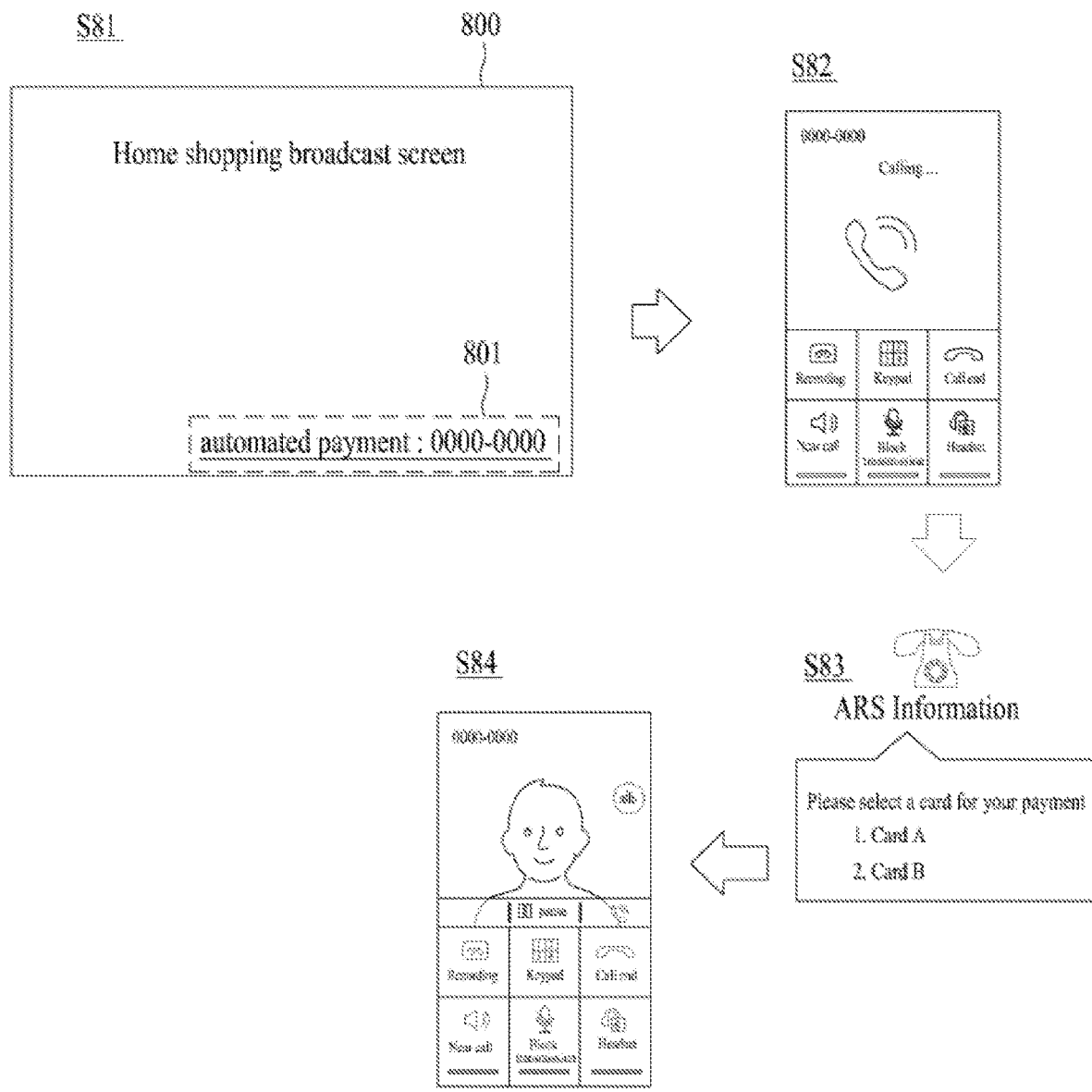
FIG. 8 illustrates another exemplary automatic payment process for a home shopping broadcast according to the principles of the invention.

FIG. 8 illustrates another exemplary automatic payment process for a home shopping broadcast according to the principles of the invention.

More specifically, a process of proceeding with an automatic payment for ordering with a home shopping broadcast using a phone is described with reference to FIG. 8.

Referring to FIG. 8, when a user views a home shopping broadcast on a TV, the home shopping server 103 may display phone number guidance information 801 for an automated payment on a home shopping broadcast screen 800 (S81).

The user may be connected to an ARS of the corresponding home shopping broadcast using a phone number disclosed at the home shopping broadcast (S82). Here, the home shopping server 103 may transfer a caller number connected to the ARS, that is, a mobile phone number of the user to the automated payment system 100.

Once the mobile phone number is received from the home shopping server 103, the automated payment system 100 may verify whether the user has agreed to an automatic payment for the home shopping broadcast and, when the user is verified to have agreed with the automatic payment, may immediately authorize the automatic payment using a payment method pre-registered by the user.

Here, prior to authorizing the automatic payment, the automated payment system 100 may perform a user authentication through an authentication procedure using a payment password, a PIN, a resident registration number, etc., with respect to the mobile phone number received from the home shopping server 103.

When a plurality of payment methods is pre-registered by the user, the automated payment system 100 may transfer information of a payment method list to the home shopping server 103 to request the user to select a specific payment method.

Once information about the payment method list of the user is received from the automated payment system 100, the home shopping server 103 may provide the payment method list through an ARS guidance that is a home shopping ordering path of the user, and may guide the user to select a specific payment method from the payment method list (S83).

The user may verify the pre-registered payment method list through the ARS guidance and may select the payment method to be used for home shopping ordering from the payment method list according to the ARS guidance (S84). The home shopping server 103 may transfer information about the payment method selected by the user to the automated payment system 100.

When a plurality of payment methods is pre-registered by the user, the automated payment system 100 may immediately authorize an automatic payment for the home shopping broadcast using the payment method selected by the user according to the ARS guidance.

Accordingly, in the case of ordering with a home shopping broadcast using a phone, the user having pre-registered a payment method and agreed with an automatic payment for the home shopping broadcast may conveniently and easily complete a payment through an authorization successfully with a mobile phone number owned by the user.

In the case of an automatic payment for a home shopping broadcast, whether the user has allowed the automatic payment may be verified through a phone number of the user upon ordering using a phone or a TV and a payment authorization may be immediately processed although a dedicated application that is executed on a terminal of the user.

According to exemplary embodiments, by providing an automated payment without requesting a user to input (orally or manually) payment information every time, it is possible to relieve the user's burden and to significantly reduce a payment time. Also, according to exemplary embodiments, it is possible to provide a user with an easy and convenient payment environment in which personal information leakage is minimized by pre-registering payment information and then immediately proceeding with a home shopping payment only with a simple authentication that does not require disclosure of account or payment details. Also, according to exemplary embodiments, it is possible to enhance the brand reputation of a home shopping company by providing an automated payment method optimized for transactions associated with a home shopping broadcast while ensuring convenience and security of a payment.

The elements described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments.

While certain exemplary embodiments and implementations have been described herein, other embodiments and modifications will be apparent from this description. Accordingly, the invention is not limited to such exemplary embodiments, but rather to the broader scope of the presented claims and various obvious modifications and equivalent arrangements.

What is claimed is:

1. An automated payment method performed by an automated payment system using a television to view a home shopping broadcast, the method comprising the steps of:
    receiving a payment request for a home shopping order from a user of a home shopping server associated with the home shopping broadcast based upon the user using a remote controller for the television to request the automated payment and, in response to the request, displaying a payment screen on a screen of the television to receive a mobile phone number inputted by the user;
    performing, in an authentication processor, authentication processing on the user based on the mobile phone number of the user included in the payment request; and
    performing, in a payment processor, payment processing corresponding to the payment request based on the mobile phone number of the user in response to successful authentication of the user,
    wherein the home shopping server is configured to include, in the payment request, the mobile phone number of the user, and further comprising the step of transmitting the payment request to the automated payment system,
    wherein the step of performing payment processing further comprises:
        transmitting a payment uniform resource locator (URL) including a link to the payment screen corresponding to the payment request to the mobile phone of the user corresponding to the mobile phone number of the user through a text message service; and
        performing the payment processing corresponding to the payment request based on payment information input through the payment screen transmitted to the mobile phone of the user through the text service,
    wherein the performing the payment processing further comprises, in response to the payment URL being selected by the user through the payment screen, automatically recognizing the home shopping broadcast from information corresponding to the payment URL and recommending a payment method most suitable for the recognized home shopping broadcast
    wherein the recommended payment method comprises providing a no-interest financing plan for the recognized home shopping broadcast, and
    wherein the step of performing payment processing corresponding to the payment request comprises:

receiving a confirmation for the payment processing from the user on the home shopping broadcast after the payment information is input on the mobile phone; and completing the payment processing based on the confirmation.

2. The method of claim 1, further comprising the steps of:

pre-registering payment information to be used for the home shopping order, and matching the payment information to the mobile phone number of the user.

3. The method of claim 2, wherein the step of matching the payment information further comprises one of the following steps:

separately registering payment information to be commonly used for a plurality of home shopping broadcasts, and separately registering payment information for each of the plurality of the home shopping broadcast.

4. The method of claim 1, wherein the step of performing payment processing further comprises:

verifying whether the user agrees to use an automatic payment for the home shopping broadcast; and performing the payment processing corresponding to the payment request using payment information matched to the mobile phone number of the user, in response to the user agreeing to use the automatic payment for the home shopping broadcast.

5. The method of claim 1, wherein the step of performing payment processing further comprises: verifying whether the user agrees to use an automatic payment for the home shopping broadcast;

verifying payment information matched to the mobile phone number of the user, in response to the user agreeing to use the automatic payment for the home shopping broadcast;

transmitting information about a plurality of payment methods to the home shopping server when the payment information includes the plurality of payment methods; and performing the payment processing corresponding to the payment request using one of the plurality of payment methods selected by the user, wherein the home shopping server is configured to provide information about the plurality of payment methods through a home shopping order path of the user.

6. A non-transitory computer-readable storage medium storing instructions that, when executed by a processor, cause the processor to perform an automated payment method using a television to view a home shopping broadcast comprising the steps of:

receiving a payment request for a home shopping order from a user of a home shopping server associated with the home shopping broadcast based upon the user using a remote controller for the television to request the automated payment and, in response to the request, displaying a payment screen on a screen of the television to receive a mobile phone number inputted by the user;

performing authentication processing on the user based on the mobile phone number of the user; and performing payment processing corresponding to the payment request based on the mobile phone number of the user in response to a successful authentication of the user, wherein the home shopping server is configured to include, in the payment request, the mobile phone number of the user, and further comprising the step of transmitting the payment request to the automated payment system, wherein the step of performing payment processing further comprises:

transmitting a payment uniform resource locator (URL) including a link to the payment screen corresponding to the payment request to the mobile phone of the user corresponding to the mobile phone number of the user through a text message service; and performing the payment processing corresponding to the payment request based on payment information input through the payment screen transmitted to the mobile phone of the user through the text service, wherein the performing the payment processing further comprises, in response to the payment URL being selected by the user through the payment screen, automatically recognizing the home shopping broadcast from information corresponding to the payment URL and recommending a payment method most suitable for the recognized home shopping broadcast wherein the recommended payment method comprises providing a no-interest financing plan for the recognized home shopping broadcast, and wherein the step of performing payment processing corresponding to the payment request comprises:

receiving a confirmation for the payment processing from the user on the home shopping broadcast after the payment information is input on the mobile phone; and completing the payment processing based on the confirmation.

7. An automated payment system configured in a home shopping server, the automated payment system using a television to view a home shopping broadcast, comprising:

an authentication processor configured to, in response to receiving a payment request for a home shopping order from a user of a home shopping server associated with the home shopping broadcast based upon the user using a remote controller for the television to request the automated payment and, in response to the request, displaying a payment screen on a screen of the television to receive a mobile phone number inputted by the user, perform authentication processing on the user based on a user information included in the payment request; and a payment processor configured to perform payment processing corresponding to the payment request based on the mobile phone number of the user in response to a successful authentication of the user, wherein the home shopping server is configured to include, in the payment request, the mobile phone number of the user, and further comprising the step of transmitting the payment request to the automated payment system, wherein the step of performing payment processing further comprises:

transmitting a payment uniform resource locator (URL) including a link to the payment screen corresponding to the payment request to the mobile phone of the user corresponding to the mobile phone number of the user through a text message service; and performing the payment processing corresponding to the payment request based on payment information input through the payment screen transmitted to the mobile phone of the user through the text service, wherein the performing the payment processing further comprises, in response to the payment URL being selected by the user through the payment screen, automatically recognizing the home shopping broadcast from information corresponding to the payment URL and recommending a payment method most suitable for the recognized home shopping broadcast wherein the recommended payment method comprises providing a no-interest financing plan for the recognized home shopping broadcast, and wherein the step of performing payment processing corresponding to the payment request comprises:
receiving a confirmation for the payment processing from the user on the home shopping broadcast after the payment information is input on the mobile phone; and
completing the payment processing based on the confirmation.

8. The automated payment system of claim 7, further comprising:
an information manager configured to pre-register payment information to be used for the home shopping order, and to match the payment information to the mobile phone number of the user.

9. The automated payment system of claim 8, wherein the information manager is further configured to separately register payment information to be commonly used for a plurality of home shopping broadcasts, and separately register payment information for each of the plurality of home shopping broadcasts.

10. The automated payment system of claim 7, wherein the payment processor is further configured to
verify whether the user agrees to use an automatic payment for the home shopping broadcast, and
perform payment processing corresponding to the payment request using payment information matched to the mobile phone number of the user, in response to the user agreeing to use the automatic payment for the home shopping broadcast.

11. The automated payment system of claim 7, wherein the payment processor is further configured to
verify whether the user agrees to use an automatic payment for the home shopping broadcast;
verify payment information matched to the mobile phone number of the user, in response to the user agreeing to use the automatic payment for the home shopping broadcast;
transmit information about a plurality of payment methods to the home shopping server in response to the payment information including the plurality of payment methods; and
perform payment processing corresponding to the payment request using a payment method selected by the user from among the plurality of payment methods, and the home shopping server is configured to provide information about the plurality of payment methods through a home shopping order path of the user.

* * * * *